United States Patent
Sedarat et al.

(10) Patent No.: US 10,594,524 B1
(45) Date of Patent: Mar. 17, 2020

(54) DATA COMMUNICATIONS USING DECISION FEEDBACK EQUALIZATION AND TOMLINSON-HARASHIMA PRECODING

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Santa Clara, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 16/247,845

(22) Filed: Jan. 15, 2019

(51) Int. Cl.
*H04L 25/497* (2006.01)
*H04L 25/03* (2006.01)

(52) U.S. Cl.
CPC .... *H04L 25/4975* (2013.01); *H04L 25/03343* (2013.01); *H04L 2025/03808* (2013.01)

(58) Field of Classification Search
CPC ........... H04L 25/4975; H04L 25/03343; H04L 2025/03808
See application file for complete search history.

(56) References Cited

U.S. PATENT DOCUMENTS

2004/0252755 A1* 12/2004 Jaffe .................. H03H 21/0012
375/233
2005/0025229 A1* 2/2005 Jones ............... H04L 25/03146
375/232

\* cited by examiner

*Primary Examiner* — Vineeta S Panwalkar
(74) *Attorney, Agent, or Firm* — Schwegman Lundberg & Woessner, P.A.

(57) ABSTRACT

Various embodiments provide for data communications using decision feedback equalization (DFE) and Tomlinson-Harashima precoding (THP).

16 Claims, 6 Drawing Sheets

DATA COMMUNICATIONS USING DECISION FEEDBACK EQUALIZATION AND TOMLINSON-HARASHIMA PRECODING

TECHNICAL FIELD

Embodiments described herein relate to signal processing and, more particularly, to systems, methods, devices, and instructions for data communications using decision feedback equalization (DFE) and Tomlinson-Harashima precoding (THP).

BACKGROUND

Within digital communications systems, analog data signals are typically transmitted from a transmitter to a receiver through a suitable signal transmission medium that links the transmitter to the receiver, often referred to as a communication channel (hereafter referred to as "channel"). Generally, the physical layer (PHY) of a data communications interface (e.g., data network interface) of a computing device is responsible for transmitting data bits over the channel and, as such, comprise a transmitter, a receiver, or both compatible the channel. Channels vary and can include, for example, wired or wireless channels. For instance, a channel can comprise a cable with multiple twisted pairs (e.g., Category 5 (CAT 5) cable or a Category 6 (CAT 6) cable) or a cable with a single twisted pair. Channel type and the physical environment can determine the presence and severity of various channel effects (e.g., interference, attenuation, and delay) with respect to a given channel, which can have detrimental effects on an analog data signal transmitted over the given channel by the time the transmitted analog data signal reaches the receiver. Generally, the PHY layer of a communications interface compatible with a given channel can compensate for channel effects and achieve a certain level of data rate/speed (e.g., 10 Mbps, 100 Mbps, 1 Gbps, 10 Gbps, or 100 Gbps) by using different types of encoding or signal modulation schemes for transmitting data over the given channel and noise. In order to guarantee interoperability among various transceivers, the transmit specifications are typically defined by standard bodies such as the Institute of Electrical and Electronics Engineers (IEEE). An example IEEE standard includes the IEEE 802.3 standards, which standardizes the physical layers of various Ethernet protocols. Among other things, the standard may specify the transmit signal modulation, transmit filtering and precoding. The modulation may be a pulse amplitude modulation (PAM) scheme (e.g., PAM2 or PAM4), and transmit filtering and precoding may be linear or nonlinear.

With respect to a given channel, channel effects can distort (e.g., cause amplitude or phase distortion) analog signal transmitted by a transmitter (e.g., of a PHY), which in turn can result in inter-symbol interference (ISI) in the transmitted analog data signal received by the receiver (e.g., of a PHY). A pulse or other symbol in a transmitted analog data signal, representing the logic state of one data bit at a cursor, can be effectively distorted by ISI. ISI can comprise a pre-cursor component (pre-cursor ISI) that distorts a transmitted analog data signal with respect to one or more data bits preceding a bit corresponding to a cursor of the transmitted analog data signal, and a post-cursor component (post-cursor ISI) that distorts the transmitted analog data signal with respect to one or more data bits succeeding a bit corresponding to a cursor of the transmitted analog data signal. Traditionally, a receiver can implement decision feedback equalization (DFE) to correct for post-cursor ISI in the signal received at the receiver, and can include a linear equalizer to correct for pre-cursor ISI in a received analog data signal. Additionally, in some instances, a transmitter can implement precoding, such as Tomlinson-Harashima precoding (THP), to pre-compensate for channel effects by using signal equalization on the transmitter side prior to the transmitter transmitting an analog signal to a receiver.

While DFE provides effective equalization, it typically suffers from error propagation where a wrong detected symbol at receiver is fed back through a DFE, which increases the probability of more error symbols. The stronger the DFE coefficients, the higher the chance of error propagation. Tomlinson-Harashima Precoding is as effective as DFE in equalization. Unlike DFE, THP does not suffer from error propagation as the transmit symbols are readily available for the transmitter and the THP; hence there is no detection error. On the other hand, THP typically increases the effective resolution of the symbol in the transmit data path. While the input to THP may take a finite number of discrete values of PAM levels, the output of the THP may take any possible value within the output range. This can increase the complexity of the transmit driver at the transmitter, and can also increase the complexity of the echo and near-end crosstalk cancellers in full duplex and multichannel systems.

Though a high data rate is often desired for applications of data communication between a transmitter and a receiver, the physical environment between transmitter and receiver can limit the type of channel that can be used therebetween and, in turn, the type of channel can determine the types of data rates that can be achieved. For instance, the in use of sensors (e.g., cameras, motion, radar, etc.) and computing equipment within vehicles (e.g., smart and autonomous cars) has increased the importance of high-speed data communications (e.g., data networking) between electronic components within vehicles. However, the types of channels that can be used in vehicle environment applications can be limited. For example, issues relating to reliability, safety, security, or government regulation can render a wireless channel non-viable option for some vehicle environment applications, and can limit wired channel options that can be used for some vehicle environment application. Additionally, wired channel options in vehicle environments applications can be further limited by other factors, such as availability of physical space for wiring within a vehicle, power requirements needed for using certain types of wired channels, and weight or cost impact of wiring (e.g., a single twisted pair cable versus a multi-twisted pair cable) needed for certain types of wired channels. Accordingly, for data communication within certain physical environments (e.g., vehicle environments and aircraft environment applications), it would be beneficial to achieve the highest data communication speeds possible over wired channels that are already suitable or available (e.g., existing) within those physical environments.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for using decision feedback equalization (DFE) and Tomlinson-Harashima precoding (THP) to communicate data over a channel, such as a wired channel. According to various embodiments, the use of DFE and THP as described herein can enable higher data rates/speeds of data communication over certain types of wired channels than possible by conventional data communication techniques/methodologies. Some embodiments described herein can enable higher speeds of data communication over certain types of wired channels using standards-based data communication (e.g., IEEE standard). Additionally, a transmitter or a receiver of an embodiment can be used in data communications over a communications network (e.g., IEEE 802.3 network). For instance, with respect to IEEE 802.3 data communication using a 10GBASE-T1 PHY layer and PAM4 encoding, an embodiment described herein can achieve a data rate of 10 Gbps over a single twisted pair cable (such as one in a vehicle or aircraft for data communication) between a transmitter and a receiver. As used herein, a transmitter or a receive can form part of a transceiver at an electronic device (e.g., computing device).

Figure 2:
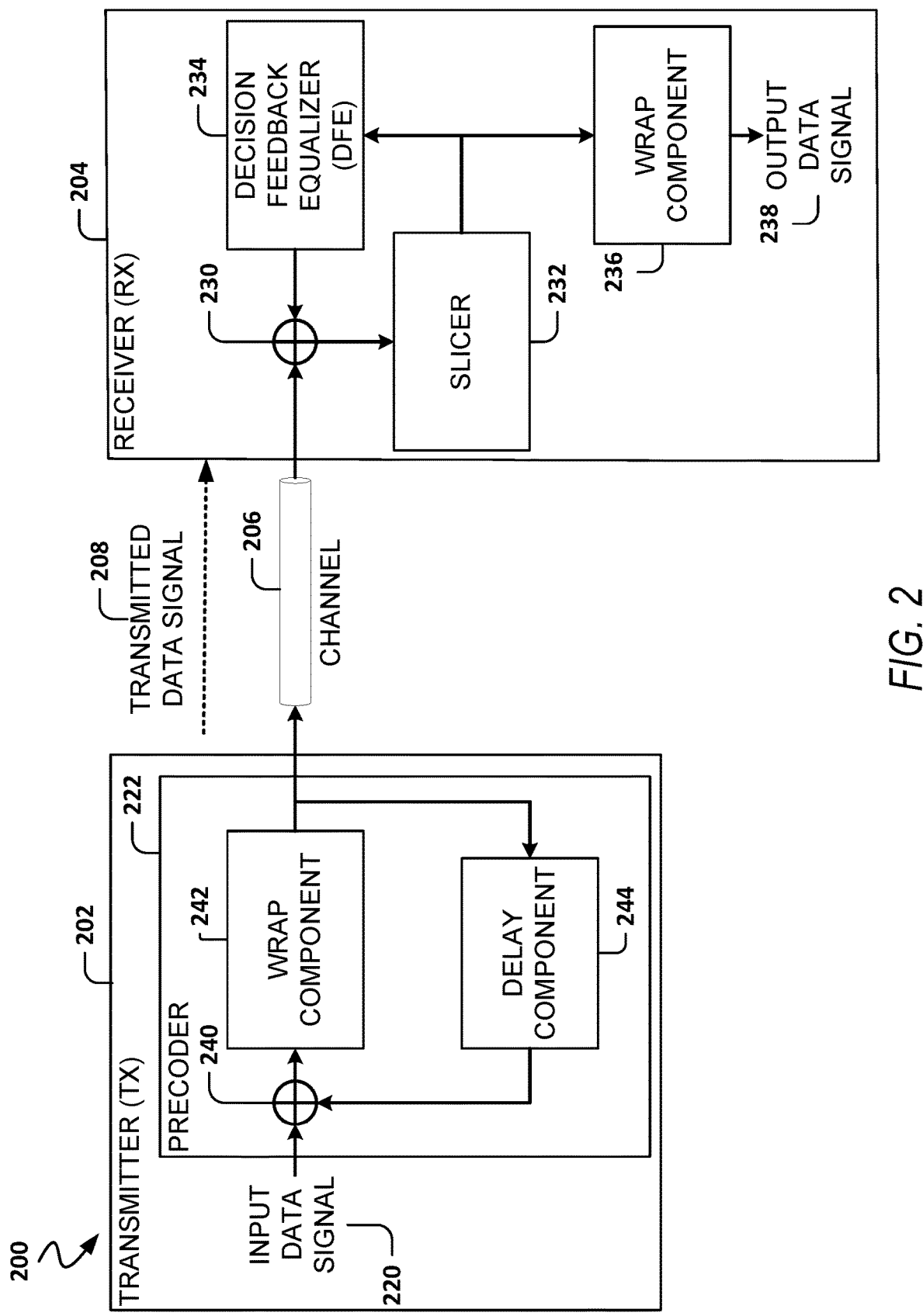
FIG. 2 is a block diagram illustrating example configurations for a transmitter and a receiver of an example data communication system, in accordance with various embodiments.

According to various embodiments, a transmitter uses Tomlinson-Harashima precoding (THP) to implement partial equalization of a data signal prior to its transmission to a receiver, and the receiver uses decision feedback equalizer (DFE) to equalize the data signal once received from the transmitter. For some embodiments, the THP is implemented at the transmitter by a precoder that uses one or more integer taps (e.g., one or two taps). For some embodiments, the tap coefficients for the precoder implementing THP have a value of 1 or −1, etc. For instance, FIG. 2 shows an example of a simple construction of a precoder implementing THP that comprises a single unity-tap. By using integer-valued coefficients (also referred to as integer coefficients) for THP, various embodiments provide the advantage that the resolution at THP output does not expand, keeping the complexity of the transmit driver and the echo and near-end crosstalk cancelers the same as a case with no THP. Though a THP with integer coefficients provides limited equalization capability, the DFE equalization system in the far-end receiver of some embodiments provides the additional equalization performance to achieve full equalization. Additionally, because the integer-tap THP of various embodiments provides partial equalization, the complementary DFE filter of the receiver requires smaller coefficient magnitude, which result in better error propagation performance.

Figure 5:
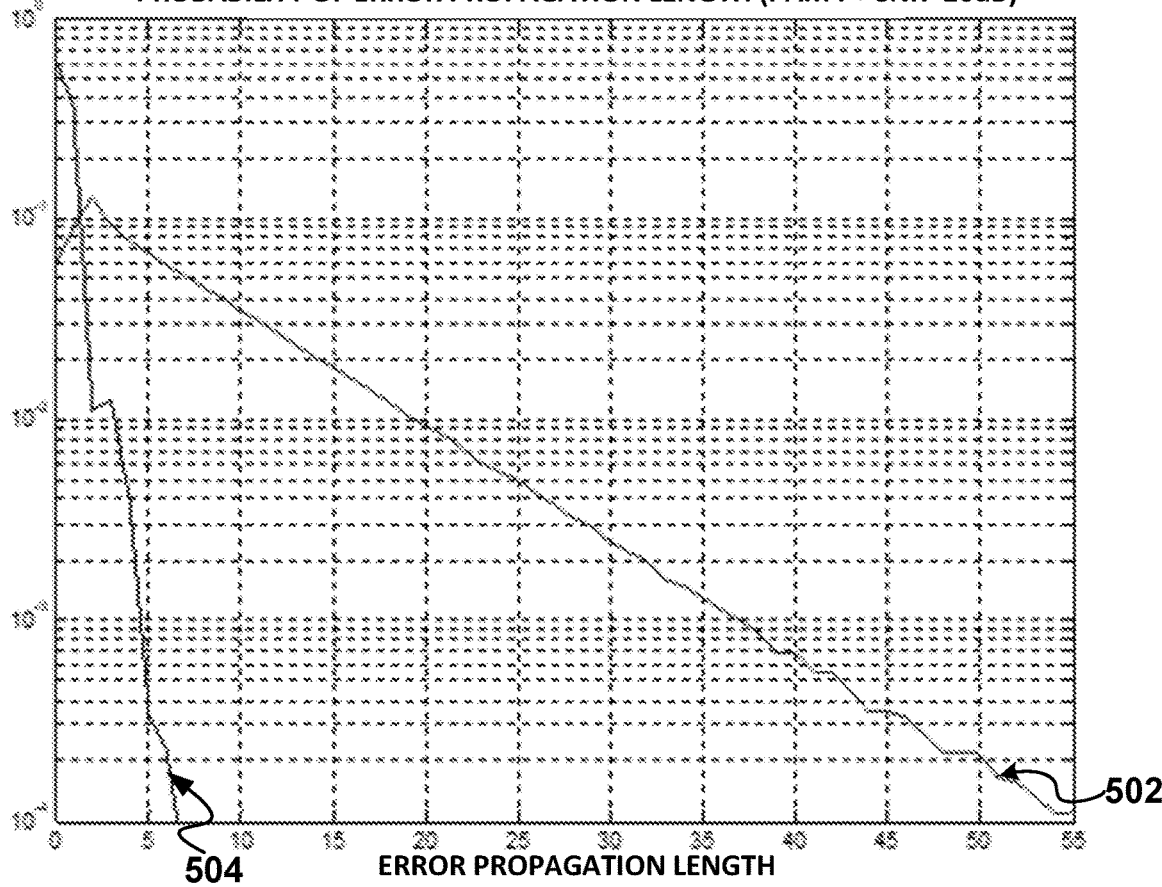
FIG. 5 is a graph illustrating an example of how an embodiment that combines THP and DFE can benefit over a conventional DFE-only data system with respect to equalizing a channel with finite impulse response.

FIG. 5 is a graph illustrating 500 illustrating an example of how an embodiment that combines THP and DFE can benefit over a conventional DFE-only data system with respect to equalizing a channel with finite impulse response of [1.0, 1.5, 0.8, 0.3]. A conventional data communication system using DFE-only equalization for this channel would use typically use a DFE with coefficients of [1.5, 0.8, 0.3]. in FIG. 5, curve 502 in the following figure shows the probability of various error propagation lengths given a symbol error for this system when modulation is PAM4 and SNR is 20 dB. The average error propagation length is 7.6 symbols. In contrast, an embodiment that uses a THP with a single unity tap at a transmitter, and uses a corresponding optimal DFE with coefficients [0.5, 0.3] at a receiver, can result in curve 504 and an average propagation error length of only 0.5 symbols. This example illustrates how an embodiment that combines THP and DFE systems benefits in limiting the length of error propagation with no additional cost in transmit driver and echo and crosstalk cancellers.

By using THP to partially equalize a data signal at the transmitter, the transmitter of an embodiment can achieve the partial equalization without expanding the resolution of the transmit data path for a data signal (e.g., without increasing the bit-width of a modulated data signal transmitted by the transmitter). Additionally, partially equalizing a data signal at a transmitter prior to transmitting the data signal to a receive can assist in reducing the complexity of signal processing at the receiver (e.g., the partial equalization makes it easier for the DFE at the receiver to filter the data signal at the receiver). Furthermore, various embodiments enable use DFE with smaller taps than used by conventional data communication techniques/methodologies, thereby reducing the chance and length of error propagation at the receiver. According to some embodiments, the THP plays a partial role in equalization on the transmitter-side, thereby simplifying the role of the DFE in performing equalization on the receiver-side, which in turn reduces the error propagation effect at the receiver.

With respect to traditional data communication systems, there are some references to nonlinear precoding (NLP) in literature (e.g., IEEE 802.3cd), which when combined with a nonlinear decoder (NLD) can mitigate DFE error propagation under certain conditions (e.g., PAM2 and single unity tap DFE and high SNR). In such cases, the NLP does not play any role in equalization and has no effect on DFE taps. In contrast, for various embodiments described herein, use of an integer-tap THP partially equalizes the signal on a transmitter-side, which in turn reduces DFE coefficients magnitude on a receiver-side. For some embodiments, this reduction in DFE coefficients magnitude mitigates the DFE error propagation effect (e.g., for all forms of modulation) on the receiver-side, for any DFE tap values, and for a wide range of SNR values. Additionally, for some embodiments, the parallel use of NLP and NLD, with THP and DFE as described herein, further reduces error propagation effect on a transmitter-side Reference will now be made in detail to embodiments of the present disclosure, examples of which are illustrated in the appended drawings. The present disclosure may, however, be embodied in many different forms and should not be construed as being limited to the embodiments set forth herein.

Figure 1:
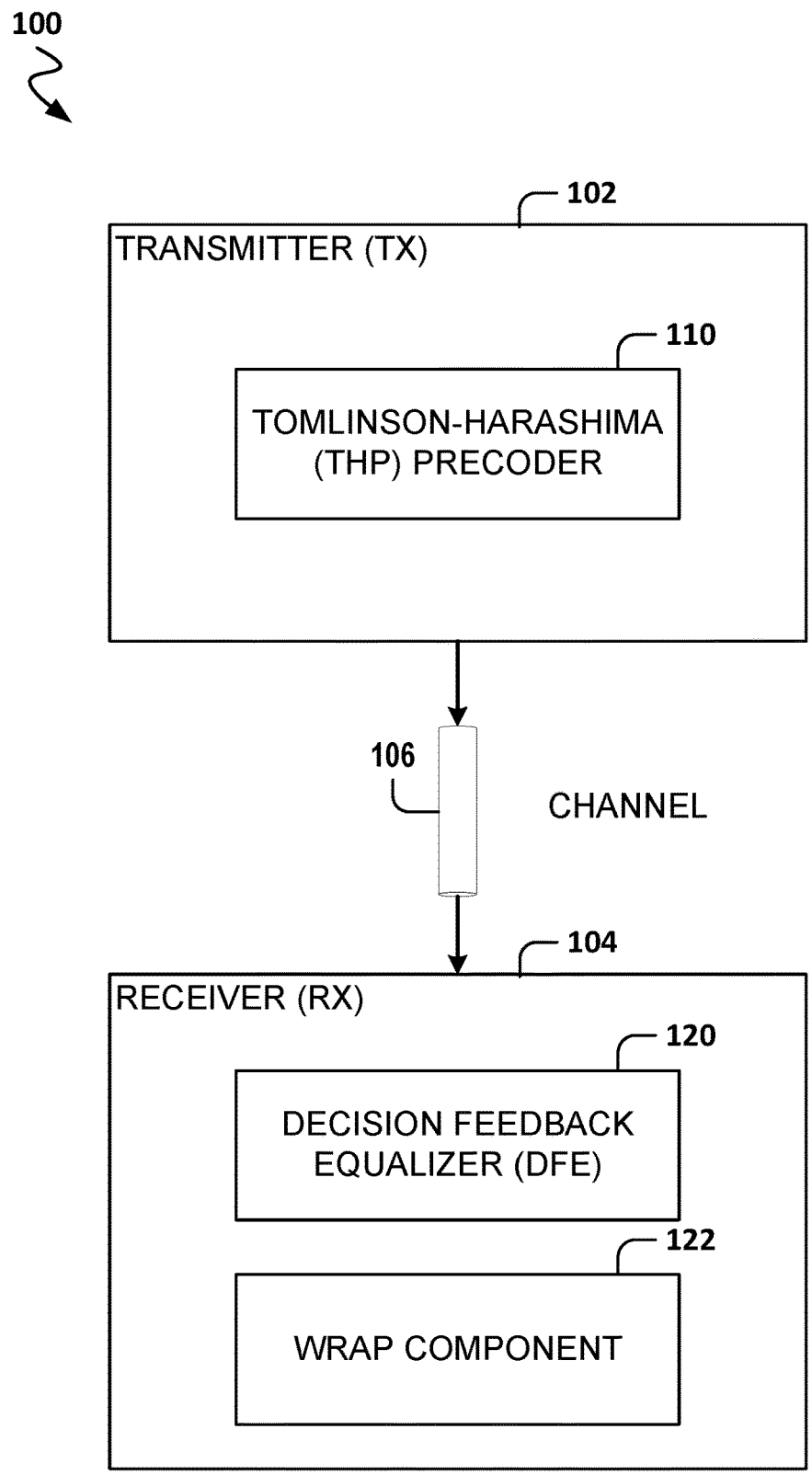
FIG. 1 is a block diagram illustrating an example data communication system that uses a decision feedback equalizer (DFE) and Tomlinson-Harashima precoding (THP), in accordance with some embodiments.

FIG. 1 is a block diagram illustrating an example data communication system 100 that uses a decision feedback equalizer (DFE) and Tomlinson-Harashima precoding (THP), in accordance with some embodiments. As shown, the data communication system 100 comprises a transmitter (TX) 102, a receiver (RX) 104, and a communication channel 106 coupled therebetween. The transmitter 102 transmits an analog data signal to receiver 104 over a channel 106, which can comprise a wire or wireless channel that permits communication of an analog data signal. Depending on the embodiment, the transmitter 102 can be part of a first electronic device (e.g., machine 600 of FIG. 6), the receiver 104 can be part of a second electronic device, and the channel 106 can comprise a conductive wire, such as a cable including one or more twisted-pairs of wires. The transmitter 102 can be implemented as an application specific integrated circuit (ASIC) of an electronic device. Likewise, the receiver 104 can be implemented as an application specific integrated circuit (ASIC) of an electronic device. Additionally, the transmitter 102 may form part of a transceiver of the first electronic device, and the receiver 104 may form part of a transceiver of the second electronic device. For some embodiments, the transmitter 102 and the receiver 104 support IEEE 802.3 data communications (e.g., 10GBASE-T1) therebetween. Additionally, data communication between the transmitter 102 and the receiver 104 may use PAM4 or some other form of modulation in generating the analog data signal that is transmitted from the transmitter 102 to the receiver 104.

The transmitter 102 comprises a Tomlinson-Harashima precoding (THP) precoder 110, and the receiver 104 comprises a decision feedback equalizer (DFE) 120, and a wrap component 122. The THP precoder 110 implements THP at the transmitter 102. In accordance with various embodiments, the THP precoder 110 enables the transmitter 102 to implement partial equalization of a data signal prior to the data signal being transmitted from the transmitter 102 to the receiver 104 over the channel 106. In doing so, the THP precoder 110 can assist the transmitter 102 in pre-compensating for inter-symbol interference (ISI) that may be introduced into the data signal as it is transmitted over the channel 106. Depending on the embodiment, the THP precoder 110 may be enabled at the transmitter 102 based on a request received from an electronic device that includes the receiver 104 (e.g., a request sent during a PHY training or negotiation phase between the electronic device including the transmitter 102 and the electronic device that includes the receiver 104). For some embodiments, the THP precoder 110 comprises one or more integer taps (e.g., all integer taps). Depending on the embodiment, each of those one or more integer taps can have a coefficient of least one 1 or −1. For example, the THP precoder 110 may comprise a single unity-tap.

In accordance with various embodiments, the DFE 120 implements signal equalization at the receiver 104, which assists the receiver 104 in compensating for any ISI still remaining in a data signal received from the transmitter 102 over the channel 106. The THP operation can effectively result in expansion of the constellation points for the far-end receiver. The wrap component 122 operates to map the points on the expanded constellation to the original constellation points, which can enable the receiver 104 to be compatible with the THP implemented by the transmitter 102 (via the THP precoder 110). For some embodiments, the wrap component 122 is constructed as a digital modulo operation.

FIG. 2 is a block diagram illustrates example configurations for a transmitter 202 and a receiver 204 of an example data communication system 200, in accordance with various embodiments. Though certain elements of the transmitter 202 and the receiver 204 can be partially or fully implemented using known components, only those portions of such known components that are necessary for an understanding of the various embodiments will be described so as to simplify and not obscure details of the various embodiments. The configuration of some embodiments can vary (e.g., in component or arrangement) from what is illustrated with respect to the data communication system 200.

As illustrated, the transmitter 202 transmits a data signal 208 to the receiver 204 over a channel 206. The transmitter 202 comprises a precoder 222 to implement THP precoding at the transmitter. For some embodiments, the precoder 222 comprises a single unity-tap precoder. Alternatively, for some embodiments, the precoder 222 comprises more than one tap with any non-unity integer tap values. The precoder 222 receives an input data signal 220 (e.g., digital data signal) and generates a precoded data signal, which can be transmitted to the receiver 204 as a transmitted data signal 208 (e.g., analog data signal) over the channel 206. The precoder 222 comprises a digital combiner 240, a wrap component 242 coupled to an output of the digital combiner 240, and a delay component 244 coupled to an output of the wrap component 242. The digital combiner 240 is coupled to an output of the delay component 244. The digital combiner 240 combines the input data signal 220 with the data signal output of the delay component 244, and generates a combined data signal that is provided to the wrap component 242. The data signal output of the precoder 222 is based on the data signal output of the wrap component 242 and, as noted herein, the transmitted data signal 208 is generated based on the data signal output of the precoder 222. The wrap component 242 operates to wrap around the constellation of the data signal received from the digital combiner 240. The delay component 244 provides a feedback data path for the precoder 222. Depending on the embodiment, the digital combiner 240 can comprise a digital adder, the wrap component 242 can comprise a modulo adder (e.g., implementing mod(2M)), and the delay component 244 can comprise a digital flip-flop (e.g., D-type flip-flop).

The receiver 204 comprises a combiner 230, a slicer 232, a decision feedback equalizer (DFE) 234, and a wrap component 236. The slicer 232, which can rounds the input signal to the closest expanded constellation point at its output, is coupled to an output of the combiner 230, each of the DFE 234 and the wrap component 236 is coupled to an output of the slicer 232, and the combiner 230 is coupled to an output of the DFE 234. The combiner 230 is configured to receive a data signal based on the transmitted data signal 208 as received from the transmitter 202 over the channel 206. The combiner 230 combines the data signal (that is based on the transmitted data signal 208) with the data signal output of the DFE 234, and generates a combined data signal that is provided to the slicer 232. The slicer 232 rounds the combined data signal output from the combiner 230 to the closest point in the expanded constellation, and provides that as output to each of the DFE 234 and the wrap component 236. The wrap component 236 operates to wrap around the constellation of the data signal received from the slicer 232 to map the signal from the expanded constellation to the main constellation. The wrap component outputs an output data signal 238 (e.g., digital data signal), which represents the input data signal 220 received by the precoder 222 of the transmitter 202.

For some embodiments, the precoder 222, the wrap component 236 and the DFE 234 of FIG. 2 respectively implement the THP precoder 110, the wrap component 122 and the DFE 120 described with respect to FIG. 1.

Figure 3:
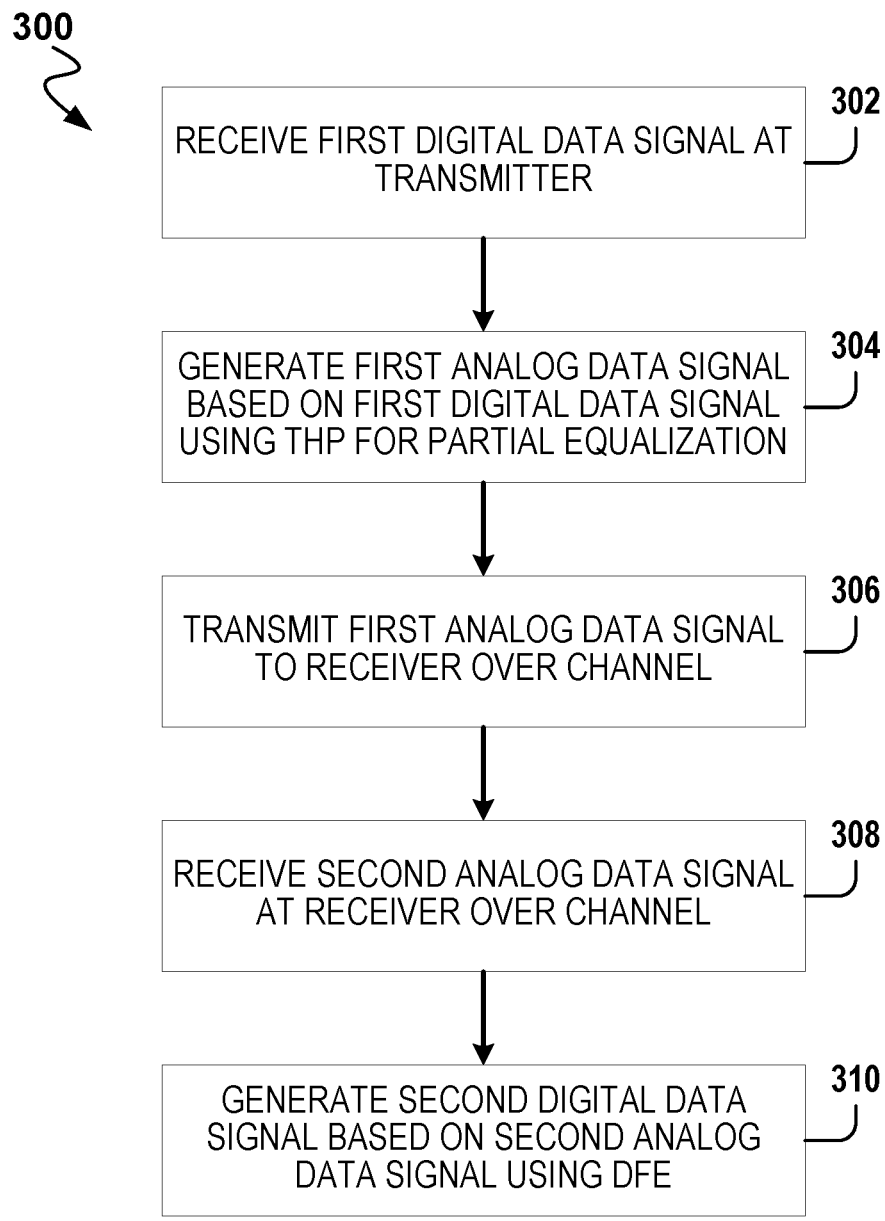
FIGS. 3 and 4 are flowcharts illustrating example methods for data communications, in accordance with some embodiments.
Figure 4:
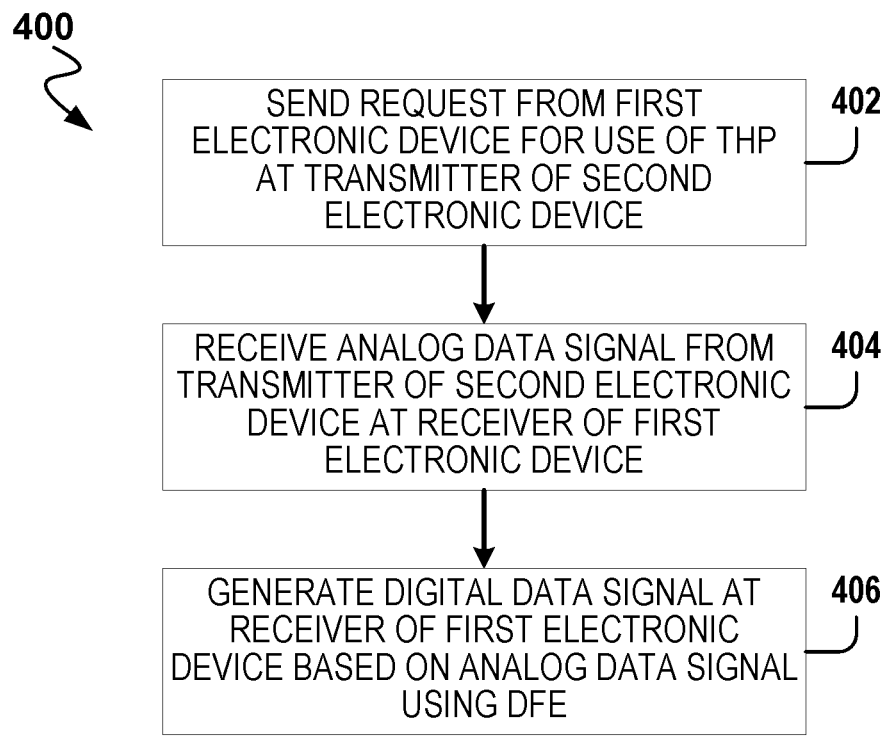

FIGS. 3 and 4 are flowcharts illustrating example methods 300 and 400 for data communications, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the method 300 may be performed by the transmitter 102 and the receiver 104 of the data system 100 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 3, the method 300 as illustrated begins with operation 302, where a transmitter (e.g., the transmitter 102) receive a first digital data signal. The method 300 continues with operation 304, where the transmitter generates a first analog data signal, based on the first digital data signal, using Tomlinson-Harashima precoding (THP). For instance, the first digital signal can be converted to the first analog data signal by a digital-to-analog converter (DAC). For operation 304, the receiver can use a precoder (e.g., the THP precoder 110) that implements THP. As noted herein, the THP can be used by the transmitter to implement partial equalization of the data signal at the transmitter prior to its transmission to a receiver. For some embodiments, the precoder implementing comprises one or more integer taps. For instance, the precoder can comprise one or two taps, where each of the taps has a coefficient value of 1 or –1. The method 300 continues with operation 306, where the transmitter transmits the first analog data signal (e.g., by the transmitter) to a receiver (e.g., the receiver 104) over a channel (e.g., the channel 106).

The method 300 continues with operation 308, where the receiver receives a second analog data signal over the channel. The second analog data signal can represent the first analog data signal (transmitted from the transmitter) after it has traveled over the channel and possibly been affected by channel effects. The method 300 continues with operation 310, where the receiver generates a second digital data signal based on the second analog data signal using a decisions feedback equalizer (DFE) (e.g., the DFE 120). Specifically, for some embodiments, the receiver converts the second analog data signal first to an intermediate digital signal (e.g., using analog-to-digital converter (ADC)), and the receiver then generates the second digital data signal based on the intermediate digital signal using the DFE. As noted herein, the DFE can be used by the receiver to further equalize the data signal received from the transmitter. As also noted herein, the DFE can comprise three or less taps. For operation 310, the receiver can further use a wrap component (e.g., the wrap component 122) to generate the second digital data signal based on the second analog data signal. The second digital data signal generated by operation 310 can represent the first digital data signal received at the transmitter at operation 302.

Referring now to FIG. 4, the method 400 as illustrated begins with operation 402, where a first electronic device that includes a receiver described herein (e.g., the receiver 104) sends a request for use of THP to a second electronic device that includes a transmitter described herein (e.g., the transmitter 102). Depending on the embodiments, the request may be sent from the first electronic device to the second electronic device during a PHY training or negotiation phase.

The method 400 continues with operation 404, where the receiver of the first electronic device eventually receives an analog data signal from the transmitter of the second electronic device. For some embodiments, the analog data signal received at the receiver of the first electronic device is generated at the transmitter of the second electronic device using THP (per the request sent at operation 402). The method 400 continues with operation 406, where the receiver of the first electronic device generates a digital data signal based on the analog data signal received (at operation 404) using DFE.

Figure 6:
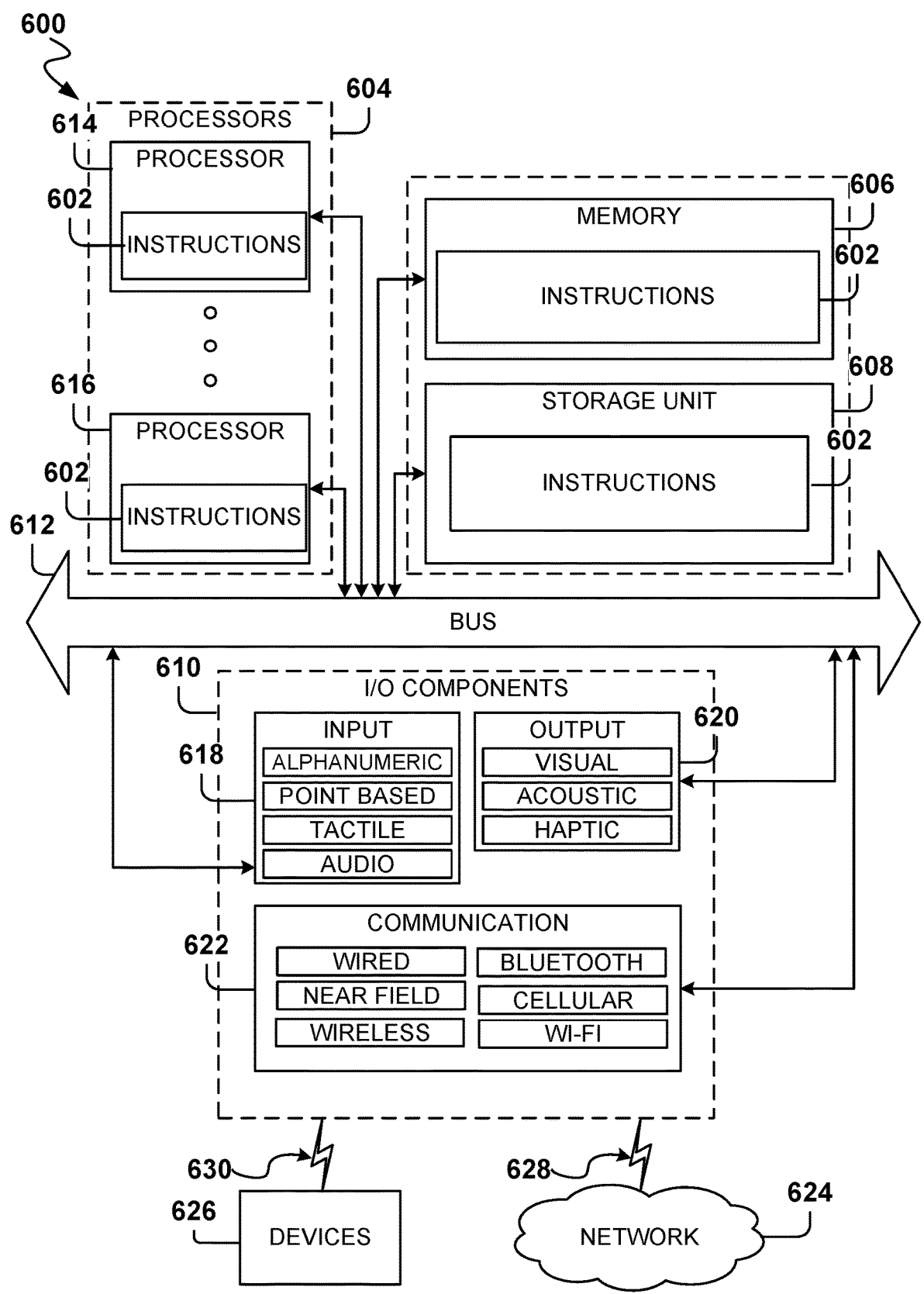
FIG. 6 is a block diagram illustrating components of a machine that can use one or more embodiments discussed herein.

FIG. 6 is a block diagram illustrating components of a machine 600 a machine that can use one or more embodiments discussed herein. Specifically, FIG. 6 shows a diagrammatic representation of the machine 600 in the example form of a system, within which instructions 602 (e.g., software, a program, an application, an applet, an app, a driver, or other executable code) for causing the machine 600 to perform one or more operations that may make use of one or more of the methodologies discussed herein. For example, the instructions 602 include executable code that causes the machine 600 to execute one or more operation that causes a transmitter or a receiver of the machine 600 (e.g., embodied by communication components 622) to perform the method 300 or 400. The machine 600 may be coupled (e.g., networked) to other machines.

By way of non-limiting example, the machine 600 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 602, sequentially or otherwise, that specify actions to be taken by the machine 600. Further, while only a single machine 600 is illustrated, the term "machine" shall also be taken to include a collection of machines 600 that individually or jointly execute the instructions 602.

The machine 600 may include processors 604, memory 606, a storage unit 608, and I/O components 610, which may be configured to communicate with each other such as via a bus 612. In some embodiments, the processors 604 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 614 and a processor 616 that may execute the instructions 602. The term "processor" is intended to include multi-core processors 604 that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 (e.g., a main memory or other memory storage) and the storage unit 608 are both accessible to the processors 604 such as via the bus 612. The memory 606 and the storage unit 608 store the instructions 602. The instructions 602 may also reside, completely or partially, within the memory 606, within the storage unit 608, within at least one of the processors 604 (e.g., within the processor's cache memory), or any suitable combination thereof, during execution thereof by the machine 600. Accordingly, the memory 606, the storage unit 608, and the memory of the processors 604 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 602. The term "machine-readable medium" shall also be taken to include any medium, or combination of multiple media, that is capable of storing instructions (e.g., instructions 602) for execution by a machine (e.g., machine 600), such that the instructions, when executed by one or more processors of the machine (e.g., processors 604), cause the machine to perform one or more operations that makes use of one or more of the methodologies described herein (e.g., the method 300 or 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 610 may include a wide variety of components to receive input, provide output, produce output, transmit information, exchange information, capture measurements, and so on. The specific I/O components 610 that are included in a particular machine 600 will depend on the type of the machine 600. For example, portable machines such as mobile phones will likely include a touch input device or other such input mechanisms, while a headless server machine will likely not include such a touch input device. It will be appreciated that the I/O components 610 may include many other components that are not specifically shown in FIG. 6. The I/O components 610 are grouped according to functionality merely for simplifying the following discussion and the grouping is in no way limiting. In various embodiments, the I/O components 610 may include input components 618 and output components 620. The input components 618 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 610 may include communication components 622 operable to couple the machine 600 to a network 624 or devices 626 via a coupling 628 and a coupling 630 respectively. For example, the communication components 622 may include a network interface component or another suitable device to interface with the network 624. In further examples, the communication components 622 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 626 may be another machine or any of a wide variety of peripheral devices. According to various embodiments, the communication components 622 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a transmitter to transmit a first analog data signal over a channel, the transmitter comprising:
a precoder that at least implements Tomlinson-Harashima Precoding, the precoder receiving a first digital data signal and generating a precoded digital data signal based on the first digital data signal, and the first analog data signal being generated based on the precoded data signal; and
a receiver to receive from the channel a second analog data signal, the receiver comprising:
a combiner;
a slicer coupled to an output of the combiner;
a decision feedback equalizer coupled to an output of the slicer; and
a wrap component coupled to an output of the slicer, the combiner generating a third analog data signal by combining the second data signal with a feedback signal from the decision feedback equalizer, and the wrap component generating a second digital data signal based on the output of the slicer.

2. The system of claim 1, wherein the precoder applies partial equalization to the first digital data signal to generate the precoded digital data signal.

3. The system of claim 1, wherein the precoder implements Tomlinson-Harashima Precoding using a single unity-tap.

4. The system of claim 1, wherein the precoder implements Tomlinson-Harashima Precoding using one or more integer taps.

5. The system of claim 1, wherein the wrap component comprises a modulo adder.

6. The system of claim 1, wherein the precoder comprises:
a digital combiner;
a second wrap component coupled to an output of the digital combiner; and
a delay component coupled to an output of the second wrap component, the digital combiner generating a third digital data signal by combining the first digital data signal with a feedback digital data signal from the delay component.

7. The system of claim 6, wherein the second wrap component comprises a modulo adder.

8. A method comprising:
receiving a first digital data signal at a transmitter;
generating, by the transmitter, a first analog data signal based on the first digital data signal, the generating the first analog data signal based on the first digital data signal comprising:
generating, by a precoder of the transmitter, a precoded digital data signal based on the first digital data signal, the precoder implementing Tomlinson-Harashima Precoding, and the precoder applying partial equalization to the first digital data signal to generate the precoded digital data signal; and
generating the first analog data signal based on the precoded digital data;
transmitting the first analog data signal to a receiver over a channel;
receiving, from the transmitter over the channel, a second analog data signal at the receiver; and
generating, by the receiver, a second digital data signal based on the second analog data signal, the receiver comprising a decision feedback equalizer.

9. The method of claim 8, wherein the generating the second digital data signal based on the second analog data signal comprises:
converting, by the receiver, the second analog data signal to an intermediate digital data signal; and
generating, by the receiver, the second digital data signal based on the intermediate digital data signal using the decision feedback equalizer.

10. The method of claim 8, wherein the precoder implements Tomlinson-Harashima Precoding using a single unity-tap.

11. The method of claim 8, wherein the precoder implements Tomlinson-Harashima Precoding using one or more integer taps.

12. A method comprising:
sending, from a first electronic device to a second electronic device, a request to enable Tomlinson-Harashima Precoding at a transmitter of the second electronic device, a channel coupling the transmitter of the second electronic device to a receiver of the first electronic device, the transmitter of the second electronic device implementing Tomlinson-Harashima Precoding to apply partial equalization to a data signal at the transmitter;
receiving, at the receiver of the first electronic device, an analog data signal from the transmitter of the second electronic device, the analog data signal being generated at the transmitter based on the data signal; and
generating, by the receiver of the first electronic device, a digital data signal based on the analog data signal, the receiver of the first electronic device comprising a decision feedback equalizer that comprises three or less taps.

13. The method of claim 12, wherein the generating the digital data signal based on the analog data signal comprises:
converting, by the receiver, the analog data signal to an intermediate digital data signal; and
generating, by the receiver, the digital data signal based on the intermediate digital data signal using the decision feedback equalizer.

14. The method of claim 12, wherein the transmitter of the second electronic device implements Tomlinson-Harashima Precoding using one or more taps, a tap coefficient of each of the one or more taps comprising a value of 1 or −1.

15. The method of claim 12, wherein the transmitter of the second electronic device implements Tomlinson-Harashima Precoding using a single unity-tap.

16. The method of claim 12, wherein the transmitter of the second electronic device implements Tomlinson-Harashima Precoding using one or more integer taps.

* * * * *